UNITED STATES PATENT OFFICE.

ERNEST LESLIE RANSOME, OF NEW YORK, N. Y.

ART OF FORMING STRUCTURES OF CONCRETE AND SIMILAR MATERIALS.

No. 800,242.  Specification of Letters Patent.  Patented Oct. 3, 1905.

Application filed January 4, 1905. Serial No. 239,617.

*To all whom it may concern:*

Be it known that I, ERNEST LESLIE RANSOME, a citizen of the United States, and a resident of the city of New York, borough of Richmond, in the county of Richmond and State of New York, have invented new and useful Improvements in the Art of Forming Structures of Concrete and Similar Materials, of which the following is a full, clear, and exact description.

The invention is applicable to the formation of various structures of concrete and like plastic materials, but it is especially applicable to concrete floors, pavements, and other structures in which the material is laid in sheet or so-called "monolithic" form.

The concrete floors are generally formed of two layers, a base or under layer and an upper or top layer, these layers being of different grades or composition suited, respectively, to the location of the layer. Heretofore difficulty has been experienced in properly joining these layers so as to form a true bond between them, making a rigid solid mass as distinguished from two distinct layers resting one on the other. In order to effect this bond, it has been necessary to place the upper layer upon the lower layer before the latter fully sets or hardens. Numerous practical objections exist to this method of procedure, since it occasions costly delays, and often even under the most skilled supervision the bond so formed is weak, and an imperfect floor is the result. Further, the top layer has been placed in position oftentimes when the conditions render it practically impossible to make a well-finished floor or other surface.

The underlying object of my invention is to enable the top layer to be placed in position after the bottom layer has been well set or hardened. This allows the operator to choose his own time for finishing the floor and to put the top layer in position at that time and under those conditions which are best suited to perfect results.

In carrying out my improvement I first place the bottom or base layer in position in the usual manner, and I allow the same to completely set or harden. When the concrete sets, its surface is formed by a hard dense "skin" or covering, the presence of which has heretofore rendered it impossible to bond or unite the top layer with the bottom layer of the floor. According to my invention after the bottom layer has set and hardened and when it is desired to place the top layer in position and finish the floor I wash this hardened surface of the said bottom layer of the concrete with an acid of such a nature as will attack and remove this hardened skin or surface of the bottom layer. For this purpose I prefer to employ a solution of hydrochloric acid. This acid attacking the said surface of the bottom layer or base removes this hardened skin and renders the bottom layer capable of cohesion with the top layer, which is to be placed thereon. Before placing the top layer, however, it is best to remove the excess of acid, the resultant salts, and disintegrated material by washing the surface of the bottom layer with water. Then the top layer of the concrete is formed in plastic condition over this prepared surface of the bottom layer, resulting in a perfect bond between the two layers and a true monolithic or integral structure. The top layer of plastic cement may be placed in position in any desired manner—for instance, by floating it onto the base or bottom layer, as is usual.

When the top layer is a mortar of "neat" cement, I deem it best and I prefer to rub or brush a portion of this neat cement into the prepared surface of the bottom layer, and before this portion sets I apply the rest of the layer in any of the usual ways by float or otherwise. When the upper layer consists of a substance other than neat cement mortar, or when it consists of a cement mortar rich with cement, but containing sand or other mineral aggregate, I consider it best and I prefer to first rub or brush into the prepared surface of the base or bottom layer a thin mortar of neat cement and then bed the finishing layer of coarser mortar or cement into this mortar before it sets.

While the invention is especially adapted for laying floors or other horizontal surfaces, I desire it understood that I am not limited to this work, and I also would point out that the invention may be employed with good results in laying tile floors where the ceramic tiles are joined by cementing to the concrete base or bottom layer. In this case the upper surface of the bottom layer is prepared as before described and the top layer or setting of the tiles formed thereon as before described, this layer serving to unite the tiles to the base or bottom layer. I would also point out that the excess of acid and salts and the disintegrated material resulting from the action of the acid on the concrete surface need not necessarily be removed by washing. Other means may be employed for the same end. For instance, these substances may be removed by brushing or scrubbing the prepared surface.

The term "cement" herein employed refers specifically to Portland cement; but obviously the invention is not limited to this precise substance and may be utilized in connection with other cement having similar characteristics with regard to bonding and the hardened set surface of which may be dissolved, disintegrated, or otherwise affected by the action of an acid or otherwise.

Having thus described the preferred form of my invention, what I claim as new, and desire to secure by Letters Patent, is—

1. The improvement in the art of forming structures of concrete or the like, which consists in forming a layer of plastic material containing cement and permitting the same to set or harden, in removing portions of the hardened surface of said layer by the action of an acid applied to said surface, and in forming a second layer of plastic material containing cement, over said surface of the first layer, and permitting the second layer to harden, whereby to form a perfect bond between the two layers.

2. The improvement in the art of forming structures of concrete or the like, which consists in forming a layer of plastic material containing cement and permitting the same to set or harden, in removing portions of the hardened surface of said layer by the action of a hydrochloric acid applied to said surface, and in forming a second layer of plastic material containing cement, over said surface of the first layer, and permitting the second layer to harden, whereby to form a perfect bond between the two layers.

3. The improvement in the art of forming structures of concrete and the like, which consists of forming a layer of plastic material containing cement, and permitting the same to harden, in removing portions of the hardened surface of said layer by the application of an acid thereto, in removing from said surface the excess of acid and resultant salts and disintegrated material, and in forming a second layer of plastic material containing cement, over said surface of the first layer, and permitting the second layer to harden, whereby to form a perfect bond between the two layers.

4. The improvement in the art of forming structures of concrete or the like, which consists in forming a layer of plastic material containing cement and permitting the same to set or harden, in removing portions of the hardened surface of said layer by the action of an acid applied thereto, in washing the surface after the action of the acid for the purpose specified, and in forming a second layer of plastic material containing cement, over said surface of the first layer, and permitting the second layer to harden, whereby to form a perfect bond between the two layers.

In testimony whereof I have signed my name to this specification in the presence of two subscribing witnesses.

ERNEST LESLIE RANSOME.

Witnesses:
  G. W. COOPER,
  FRANK V. LAWRENCE.